J. VON BRETHORST AND F. W. PRIESTLEY.
CHECK PROTECTOR.
APPLICATION FILED JAN. 5, 1917.

1,316,414.

Patented Sept. 16, 1919.
5 SHEETS—SHEET 1.

WITNESSES

INVENTOR
Joergen Von Brethorst &
Frank W. Priestley,
BY Victor J. Evans
ATTORNEY J. VON BRETHORST AND F. W. PRIESTLEY.
CHECK PROTECTOR.
APPLICATION FILED JAN. 5, 1917.

1,316,414.

Patented Sept. 16, 1919.
5 SHEETS—SHEET 2.

WITNESSES
Hugh H. Ott
Wm. Bagger

INVENTOR
Joergen Von Brethorst,
Frank W. Priestley,
BY Victor J. Evans
ATTORNEY

J. VON BRETHORST AND F. W. PRIESTLEY.
CHECK PROTECTOR.
APPLICATION FILED JAN. 5, 1917.

1,316,414.

Patented Sept. 16, 1919.
5 SHEETS—SHEET 4.

WITNESSES
Hugh H. Hett
Wm. Bagger

INVENTOR
Joergen Von Brethorst,
Frank W. Priestley,
BY Victor J. Evans
ATTORNEY

UNITED STATES PATENT OFFICE.

JOERGEN von BRETHORST AND FRANK W. PRIESTLEY, OF WEBSTER CITY, IOWA, ASSIGNORS TO HERBERT J. BUELL AND WILLIAM B. ROOD, BOTH OF WEBSTER CITY, IOWA.

CHECK-PROTECTOR.

1,316,414.　　　Specification of Letters Patent.　　Patented Sept. 16, 1919.

Application filed January 5, 1917. Serial No 140,798.

*To all whom it may concern:*

Be it known that we, JOERGEN VON BRETHORST and FRANK W. PRIESTLEY, citizens of the United States, residing at Webster City, in the county of Hamilton and State of Iowa, have invented new and useful Improvements in Check-Protectors, of which the following is a specification.

This invention relates to check protectors which are used for marking or filling in checks with the amount denoting the value thereof, the lettering being cut, punctured or otherwise mutilated in the act of forming the impression in such a manner as to make any subsequent change for the purpose of raising the value of the check impossible.

The invention has particular reference to that class of check protectors in which a type wheel is supported for rotation to enable any predetermined row of type to be brought into registry with a platen, which latter is movable in the direction of the type wheel, means being provided for inking the type and for guiding and feeding a check between the type wheel and the platen to receive one or more impressions, as may be required, to indicate the value of the check.

Among the objects of the invention are the improvement and simplification of the feed mechanism and the spacing mechanism.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Corresponding parts in the several figures are denoted by like characters of reference.

The frame or casing of the improved machine includes a base member A and a top member B, the same being separably assembled by stud screws or machine bolts 15. The base member A has a detachable bottom plate 16 which is detachably secured by fastening members 17 which are also utilized for securing in place cushion members 18 that constitute supporting feet for the device. The top member B, which is substantially hood-shaped, has a detachable rear wall member 19 to afford convenient access to the interior.

Figure 3:
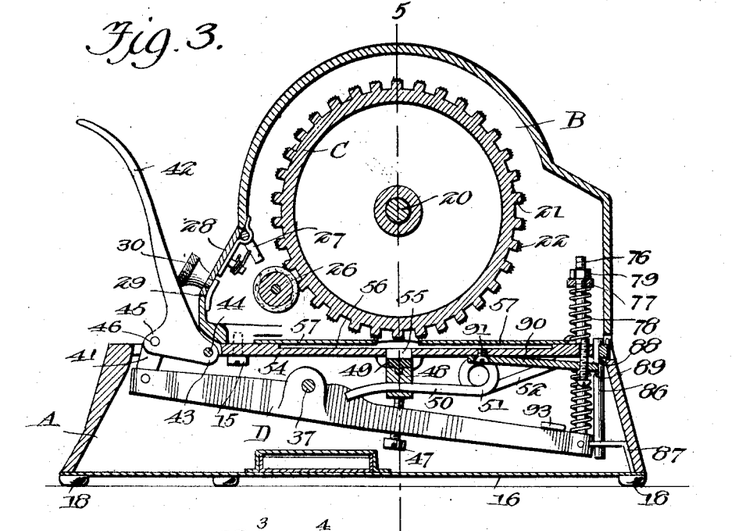
Fig. 3 is a vertical sectional view taken on the line 3—3 in Fig. 5.

Supported for rotation in the front and rear wall portions of the top member B of the casing is a shaft 20 carrying a type wheel which latter is generally designated by C. Said type wheel consists of a cylindrical casting which, for the sake of lightness, may be made hollow, as seen for instance in Fig. 3. Formed exteriorly on the cylinder are rows of type indicating various values, some rows of type spelling numbers from "one" to "nineteen", inclusive; other rows spelling multiples of ten from "twenty" to "ninety", inclusive, and other rows spelling the words "hundreds", "thousands", "dollars", "cents", "only", and such other words and designations as may be required, as is usual in machines of this kind. The rows of type are individually designated by 21, but the type faces are formed by spurs or projections 22, preferably of pyramidal or conical shape, said spurs or projections being so arranged as to outline the desired letters on the flat base portions 21 which constitute the type rows. It will be noted that it is the spurs or projections 22 which by puncturing or penetrating the paper of which the check is made form the outline letters which spell the desired words, and these spurs or projections being inked by the means provided for the purpose will indelibly color the punctures, making the letters and words plainly visible and making subsequent alteration without detection impossible, because the color is conveyed through the body of the paper. The bases 21 of the type rows are equidistantly spaced apart around the circumference of the type wheel, and the latter is rotatable by means of a handle 23 fixed on the shaft 20. Said shaft also carries an indicator disk 24, the words and figures of which correspond with those on the type wheel, said words and figures on the indicator disk being capable of being brought into registry with a crescent-shaped index 25 which is fixed on the front wall of the top member of the casing.

Figure 4:
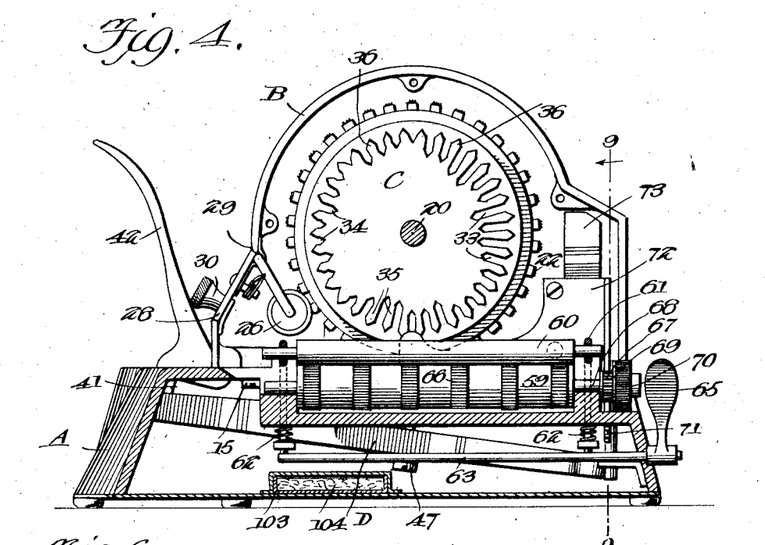
Fig. 4 is a vertical sectional view taken on the line 4—4 in Fig. 5.

The inking device comprises an inking roller 26, the same being carried by a spring pressed arm or yoke 27 pivotally supported by a plate 28 which constitutes a closure for an opening 29 in the end wall of the top member of the casing, said closure plate, when in position, as seen in Fig. 4, being detachably secured by means of a turn button 30. The spring 31 which actuates the arm or yoke 27 in the direction of the type wheel may be suitably connected with the cover plate by means of a stud 32. The parts are so arranged and proportioned that when the type wheel is in printing position, the inking roll 26 will engage between two of the type bases 21, so that it will in a measure act as a pawl or dog, whereby rotation of the type wheel will be obstructed. It is, of course, not intended that the rotation of the type wheel shall be prevented by engagement of the inking roller therewith in the manner set forth, but merely that by engaging between two of the type bases the spring actuated inking roller will tend to prevent accidental displacement or rotation of the type wheel, and will maintain the same in proper position to be engaged by the feed gage, as will be presently described.

Figure 7:
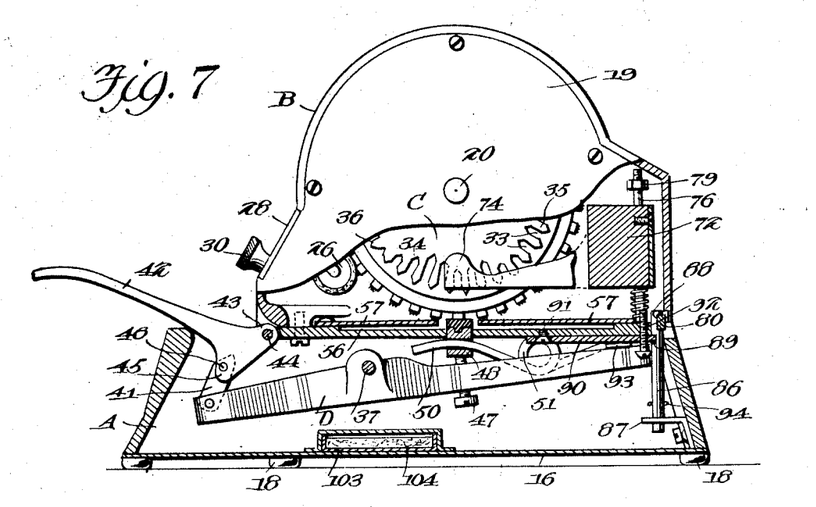
Fig. 7 is a rear elevation of the machine, parts of the casing having been broken away, and some parts having been shown in section.

The type wheel is provided on the rear face thereof with circumferentially disposed slots or notches 33 that coincide with the type bases 21, each of said slots being of a length commensurate with that of the type base adjacent to which it is formed, it being obvious that the slots adjacent to type bases bearing long words are longer than the slots adjacent type bases bearing short words, a regular proportion being observed between the respective lengths of the type bases and the slots. The slots 33 are tapered or V-shaped at their inner ends, as will be clearly seen at 34, see Figs. 4 and 7, and the ribs or fingers 35 intermediate the slots 33 are preferably V-shaped at their outer ends, as will be seen at 36, this being for the purpose of widening the outer end portions which form the entrance mouths of the slots.

Figure 5:
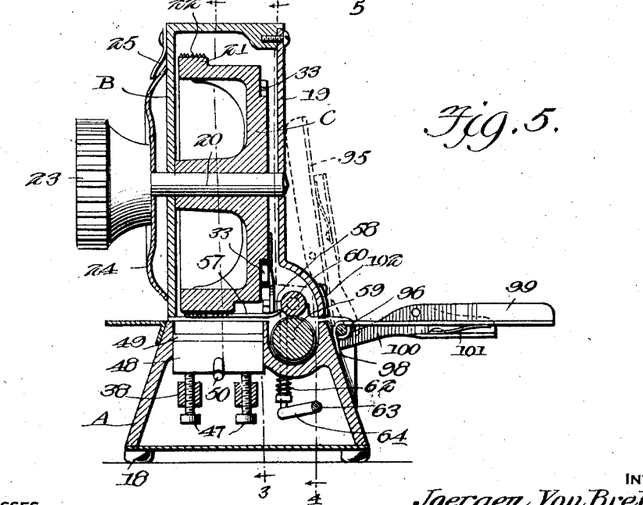
Fig. 5 is a vertical sectional view taken on the line 5—5 in Fig. 3.
Figure 6:
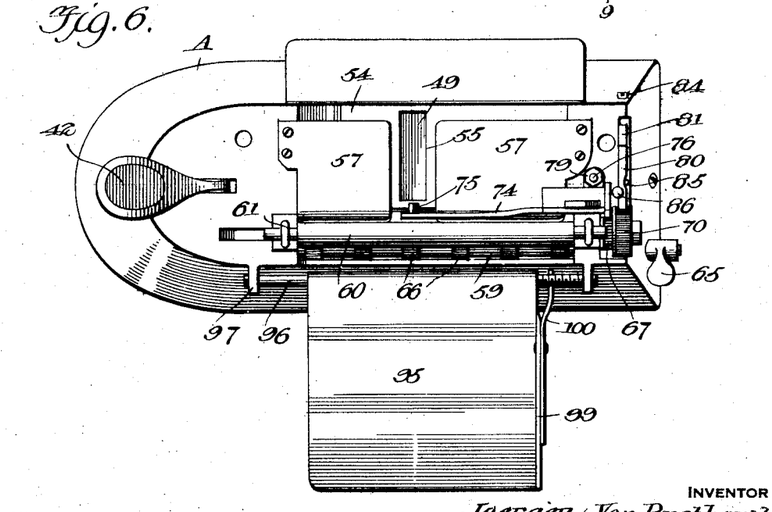
Fig. 6 is a top plan view of the base portion of the machine and related parts, the top casing with its contents having been removed.

Supported on the base A on a transverse pin or fulcrum member 37 is a lever D which has been shown as being of bifurcated form, being equipped with an auxiliary limb 38 which is connected with the body portion of said lever by a bridge piece 39. The bifurcated construction of the lever D is resorted to mainly from consideration of lightness and in order to save space. One arm of the lever D is connected by a link 41 with an operating lever or hand lever 42, the latter being constructed with a toe 43 for the passage of a fulcrum member 44 and with a heel 45 for the passage of the pivot member 46, whereby it is connected with one end of the link 41. A construction is thus afforded whereby, by manipulating the hand lever 42, the lever D may be rocked about the axis of its fulcrum member 37. The lever D and its auxiliary limb 38 are provided with threaded apertures for the passage of screws 47 that serve to support a platen which consists of a block 48 of steel or the like having a face plate 49 of rubber or other yieldable material. The platen is held in engagement with the supporting screws 47 by one arm 50 of a coiled spring 51, the other arm of which, 52, is secured to the top portion of the base by a fastening member, such as a screw 53, best seen in Fig. 2. The platen block 48 is apertured for the passage of the spring arm 50, whereby it is forced downwardly with respect to the supporting screws 47, the tendency of the spring arm 50 being not only to maintain the platen block in engagement with the supporting screws, but also to actuate in a downward direction that portion of the lever D carrying said screws, thereby lifting that end of the lever which is connected with the actuating lever 42. The base member A has a top plate 54 which is provided with a slot 55 through which, by manipulating the hand lever 42, the platen may be projected upwardly in engagement with the type wheel, the retraction of the platen following when the downward pressure on the hand lever 42 is terminated. The top plate 54 has a shallow recess 56 to accommodate the check which is to be stamped or operated upon. Secured upon the top plate and extending over the recess 56 in the direction of the slot 55 are stripping plates 57, consisting of thin resilient plates of steel or the like, said plates being provided with upwardly curved front edges 58, as best seen in Fig. 5, to enable the check to be readily inserted beneath said stripping plates. These plates, in addition to stripping the check from the sharp points or spurs of the type, will protect the face of the check against being defaced or blemished by ink from adjacent type rows to that from which an imprint is taken.

Two feed rolls are provided, one of said rolls, 59, being supported for rotation in stationary bearings in the base A, and the other roll, 60, being supported for rotation in bearing members 61 that are vertically slidable with respect to the base. The roll 60 is shown as being supported above the roll 59, and it is forced in the direction of said roll 59 by means of springs 62, whereby the bearing members 61 are actuated. 63 is a rock shaft having arms 64 that engage the bearing members 61, and whereby said bearing members may be actuated against the tension of the springs 62 to lift or move the roll 60 so as to space it from the roll 59 sufficiently to enable a check to be conveniently inserted or removed. The rock shaft 63 has a handle 65, whereby it may be conveniently manipulated. The rolls 59, 60 are of such length as to extend over the greater portion of the width of the machine, and one of said rolls is milled or knurled circumferentially at intervals, as seen at 66, for the purpose of gripping the check tightly and preventing its being fed otherwise than straight through the machine.

The feed mechanism includes a pinion 67 which is loosely supported for rotation on the journal 68 of the roll 59, said pinion having a face plate 69 which constitutes a clutch member coöperating with a clutch member 70 which is fixed on the journal 68. The clutch may be of any well known and approved construction. In the drawings we have shown the element 70 provided with recesses 70′ receiving balls which engage collar 67′ on face plate 69 carried by pinion 67. The pinion is engaged by a rack bar 71 which is fixed on a slide 72, known as the spacing head, guided for vertical movement on a post 73. The slide 72 has a laterally extending arm 74 that extends beneath and in front of the type wheel, said arm having a lug 75 that is adapted, on the upward movement of the slide 72, to engage one of the notches or slots 33, the upward movement of the slide being gaged and limited by the length of the notch or slot. The parts will be so arranged that on the upward movement of the slide 72 the pinion 67 will be idly rotated on the journal of the feed roll 59, while on the downward movement of the slide the feed roll will be positively rotated for a distance commensurate with the length of the slot 33 engaged by the lug or stop member 75.

The slide 72 is actuated by the lever D, the latter being provided with a pin 76 which is pivotally connected with said lever and guided through a lug 77 on the slide, a spring 78 being coiled about the pin 76 between the lever D and the lug 77. The pin 76 is threaded at its upper end for the reception of a nut 79, whereby the spring may be tensioned. It will be seen that by this construction when the lever D is rocked by means of the hand lever 42, the slide 72 will be moved upwardly with respect to the guide post 73 until the upward movement is interrupted by engagement of the stop lug 75 with one of the notches 33. If the notch is a short one, it is obvious that the rocking movement of the lever D will not have been sufficient to carry the platen into effective engagement with the type row exposed above the slot 55. The rocking movement of the lever, however, may be continued until the platen has been carried to the limit of its movement, because the pin 76 will slide upwardly through the apertured lug 77, the spring 78 being thereby compressed or tensioned and serving to maintain the slide 72 in its raised position. When pressure upon the hand lever is released, the lever D will be restored to its initial position by the joint action of the springs 51 and 78, the engagement of the nut 79 with the lug 77 forcing the slide 72 downwardly with the effect of rotating the feed roll 59 to an extent commensurate with the length of the slot 33 in the type wheel, as hereinbefore described.

Figure 1:
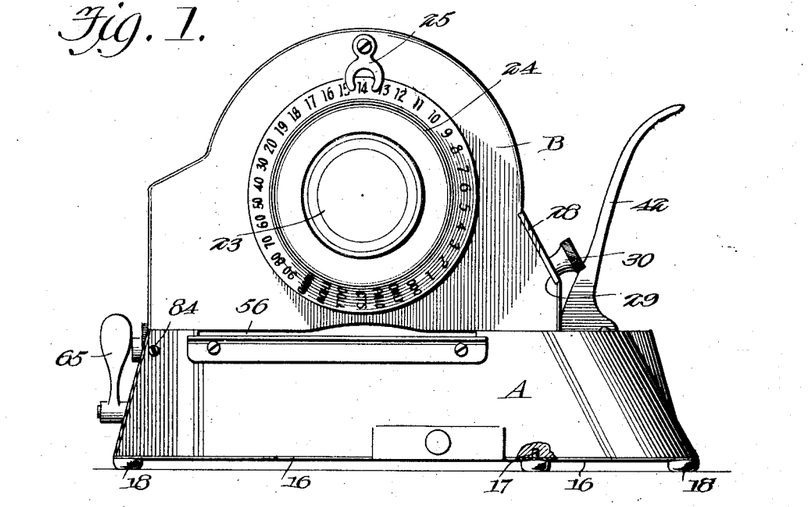
Figure 1 is a front elevation of a check protector constructed in accordance with the invention.
Figure 2:
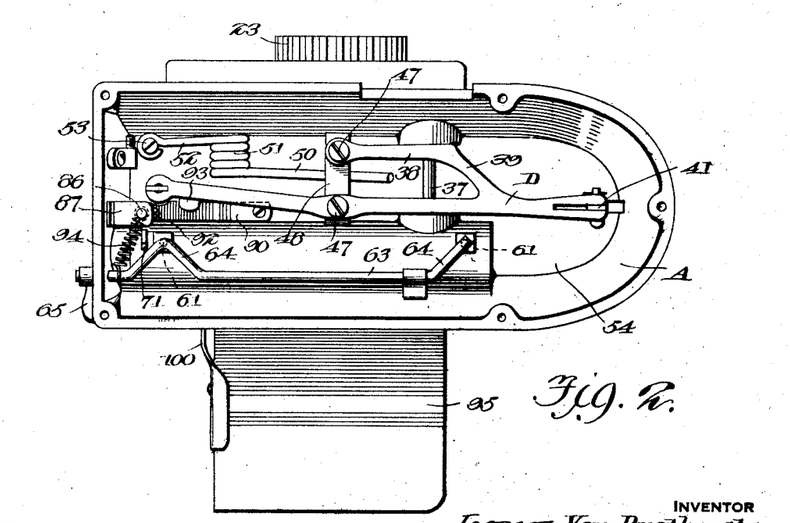
Fig. 2 is a bottom plan view, the bottom plate having been removed.
Figure 8:
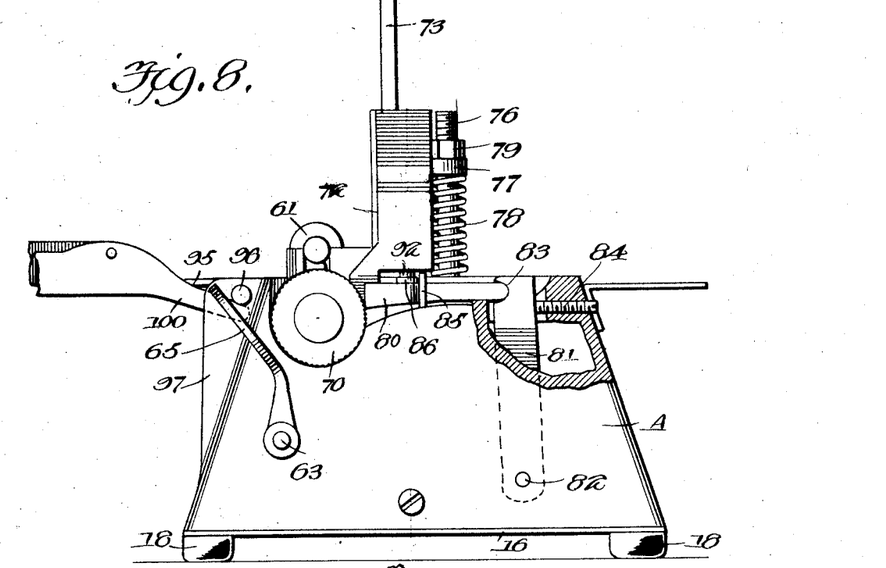
Fig. 8 is an end view of a portion of the construction.
Figures 9, 13:
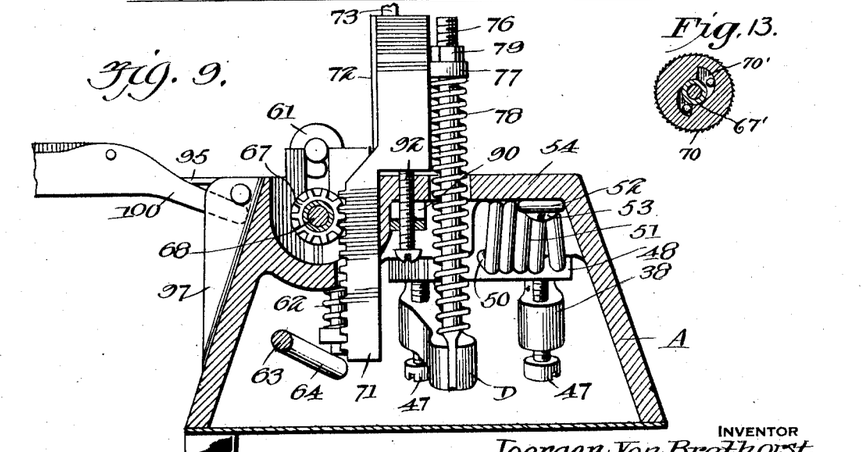
Fig. 9 is a detail view in section taken on the line 9—9 in Fig. 4.
Fig. 13 is a detail view showing the clutch elements of the feed mechanism.
Figures 10, 11, 12:
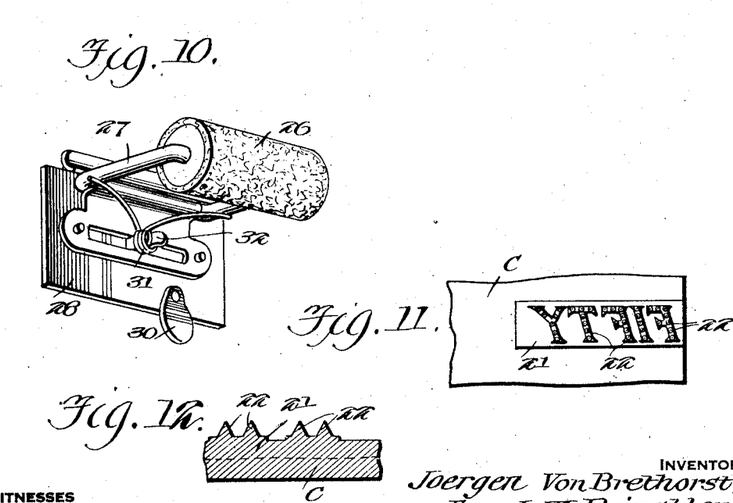
Fig. 10 is a perspective detail view of the inking device, detached.
Fig. 11 is a plan view, enlarged, of a portion of the type wheel illustrating the particular construction or configuration of the type.
Fig. 12 is a detail in section of a portion of the type wheel.

It is important to prevent premature feed motion of the feed roll 59 before the printing stroke of the levers 42 and D has been completed, it being evident that in the absence of provision of this kind the premature release of the hand lever would result in imparting a feed movement to the check without any imprint or impression having been made thereon. To prevent such a contingency there is provided a dog or pawl 80 which is held in engagement with the clutch member 70, which latter is circumferentially milled or knurled, as best seen in Fig. 8. The dog 80 is carried by an arm 81 which is pivotally supported at 82, said arm having a recess 83 in which one end of the dog 80 is swingingly or pivotally supported, the other end of the dog being held in engagement with the circumference of the clutch member 70 with a degree of pressure which may be regulated by a tension screw 84 engaging the swingingly supported arm 81. A guide pin 85 is provided to retain the dog 80 in position without interfering with the free movement thereof. For the purpose of actuating the dog 80 to release it from the clutch member 70, there is provided a vertically movable pin or bolt 86, said pin being guided at its upper end through the top plate of the base, and at its lower end through an apertured bracket 87, and said pin having near its upper end a notch or recess 88, see Fig. 7, which loosely receives the dog 80. The pin or bolt 86 has a second notch 89 that receives the free end or toe of a plate 90, the other end of which is loosely fixed on the under face of the top plate 54 of the base A by a screw or fastening member 91. The plate 90 carries near its free end an adjusting screw 92 which is designed to operate as a stop to limit the downward movement of the slide 72 in the path of which it is located. The free end of the plate 90, which may be termed a tripping plate, is normally permitted to sag beneath the top plate 54 of the base A, the sagging position being indicated in Fig. 3, where the levers 42 and D have been shown in normal or initial position, previous to operation. The lever D is provided with a laterally extending lug 93 which, when the lever is rocked to the limit of its movement, will strike or impinge on the tripping plate 90, thereby elevating the latter and causing it to lift the pin or bolt 86, whereby the dog 80 will be correspondingly lifted so as to disengage its free end from the clutch member 70. It will be understood that this disengagement of the dog from the clutch member does not take place until the completion of the printing movement of the lever D and subsequent to the upward movement of the slide 72 having been arrested by engagement of the lug 75 with one of the notches 33. A tension spring 94, best seen in Fig. 2, is provided whereby the pin or bolt 86 will be held in frictional engagement with the guide member or bracket 87, so that when raised or elevated by the means provided for the purpose, the said pin will not gravitate to its initial position or be positively restored to such position until the proper time. It may be here mentioned that the parts are to be so arranged and proportioned that the printing stroke of the lever D will not be completed until subsequently to the time at which the upward movement of the slide 72 is arrested by engagement of the lug 75 with the longest slot 33 in the type wheel, the movement of the lever D beyond such point being necessary in order that the dog 80 may be released from engagement with the clutch member 70. The dog 80 will remain disengaged from the clutch member 70 until the return movement of the lever D and the slide 72 is nearly completed; the slide 72 will then strike the adjusting screw or stop member 92, thereby restoring the tripping plate 90, the pin or bolt 86 and the dog 80 to initial position with the dog in engagement with the clutch member 70, thereby preventing further movement of the parts actuated by the downward movement of the slide 72. It has already been stated that the feed movement of the roll 59 is commensurate in extent with the rows of type on the printing wheel, the movement being gaged by the interengagement of the notches 33 with the lug 75. By proper adjustment of the screw 92 the movement of the slide 72 may be gaged so as to provide the proper spacing between two words successively imprinted on a check by the operation of the machine, adjustment of the screw in a downward direction evidently having the effect of slightly increasing the possible movement or stroke of the slide 72, thereby lengthening the space while adjustment of the screw in an upward direction will obviously have the effect of shortening the space.

It will be seen that by the construction described, if the lever 42 is actuated to rock the lever D to begin a printing stroke, and if the lever 42 is released prior to the completion of the stroke, the dog 80 will lock the clutch member 70 and the roll 59, preventing any feed movement of the latter. The parts will remain locked in this position until the lever 42 is manipulated to actuate the lever D to complete the printing stroke, when, as previously stated, the dog will be released from the clutch member, permitting the lever D, the slide 72 and related parts to return toward initial position, the movement continuing until interrupted by reëngagement of the dog 80 with the clutch member 70. A complete safety device is thus provided, whereby premature feeding of the check is prevented, and an effective means for regulating the length of the interspace between words is also obtained.

A check supporting table or platform 95 is pivotally mounted on a screw-threaded rod 96 which is supported in bearings 97 on the base of the machine, said table having a flange 98 which is adapted to abut on one side of the base, thereby sustaining the table in a horizontal position. When the device is not in use, the table may be folded to the position shown in dotted lines in Fig. 5, which is convenient for packing the device for storage or shipment. The table has at one side thereof a guide flange 99 on which is pivoted a lever 100, one arm of which is held in engagement with the threaded portion of the rod 96 by the action of a spring 101, see Fig. 5. By pressing the spring actuated end of the lever so as to release the latter from the screw threaded rod, the table may be slid or moved along the latter to a position in which the portion of the check that is to be printed upon will be in registry with the type wheel, as indicated by an indicator 102 which is fixed on the base A.

From the foregoing description taken in connection with the drawings hereto annexed, the operation and advantages of this invention will be readily understood by those skilled in the art to which it appertains. The construction of the improved device is simple and compact, and the parts, considering the service performed, are few and not liable to get out of order. For convenience in replenishing ink on the roller 26 the bottom plate of the base member A has been shown as supporting a drawer 103 containing an inking pad 104.

Having thus described the invention, what is claimed as new, is:—

1. In a machine of the class described, a casing, a type wheel supported for rotation, a printing lever, means for actuating said lever, adjustable supporting means extending through the lever, a platen supported by said adjustable means, a spring fixed in the casing and having an arm extending through the platen to hold the latter in engagement with its supporting means and also to retract the platen and the printing lever with respect to the type wheel, feed mechanism and means controlling the time of operation thereof, said means last named including a tripping plate actuated by the lever.

2. In a machine of the class described, a casing including a base and a top member, said base having a top plate provided with a shallow recess and with a slot for the passage of a platen, a type wheel supported in the top part of the casing, a printing lever supported in the base of the casing, a platen carried by the lever, a spring engaging the platen to hold it in engagement with the lever and to actuate said lever and platen to retract the same with respect to the type wheel, means for actuating the printing lever, feed mechanism and means controlling the time of operation thereof, said means last named including a tripping plate actuated by the lever.

3. In a machine of the class described, a casing including a base and a top member, said base having a top plate provided with a shallow recess and with a slot for the passage of a platen, a type wheel supported in the top part of the casing, a printing lever supported in the base of the casing, a platen carried by the lever, a spring engaging the platen to hold it in engagement with the lever and to actuate said lever and platen to retract the same with respect to the type wheel, and means for actuating the printing lever, in combination with stripping plates supported on the top plate of the base and extending over the shallow recess in the direction of the platen slot.

4. In a machine of the class described, a casing including a base and a top member, said base having a top plate provided with a shallow recess and with a slot for the passage of a platen, a type wheel supported in the top part of the casing, a printing lever supported in the base of the casing, a platen carried by the lever, a spring engaging the platen to hold it in engagement with the lever and to actuate said lever and platen to retract the same with respect to the type wheel, and means for actuating the printing lever, in combination with stripping plates supported on the top plate of the base and extending over the shallow recess in the direction of the platen slot, said stripping plates having upcurved front edges.

5. In a machine of the class described, a guide post, a spacing head guided thereon and having a rack, feed mechanism including a pair of coacting rolls, means for driving one of the rolls, said means including the rack carried by the spacing head and a clutch coöperating therewith, and means for actuating the spacing head and for limiting the movement thereof, said means comprising a printing lever, and a resilient connection between the printing lever and the spacing head and a pivoted plate controlled by the printing lever and means coöperating with the plate and governing the time of operation of the feed mechanism.

6. In a machine of the class described, a type wheel having spacing slots, a guide post, a spacing head guided thereon and having means designed to engage the spacing slots to limit the movement of the spacing head in one direction, a rack carried by the spacing head, feed mechanism including a pair of coacting rolls, means for driving one of the rolls including the rack carried by the spacing head and a clutch device coöperating therewith, adjustably supported means for limiting the retracting movement of the spacing head with respect to the type wheel, and means for actuating the spacing head including a printing lever and a resilient connection between said lever and the spacing head.

7. In a machine of the class described, a guide post, a spacing head guided thereon and having a rack, a type wheel, means for limiting the movement of the spacing head in the direction of the type wheel, feed mechanism including a pair of coacting rolls, means for driving one of the rolls including the rack carried by the spacing head and a clutch device coöperating therewith, a pivotally supported dog engaging the clutch device to prevent backlash of the feed roll, swingingly mounted supporting means for the dog, and means for effecting adjustment of the swingingly mounted supporting means.

8. In a machine of the class described, a guide post, a spacing head guided thereon and having a rack, a type wheel, means for limiting the movement of the spacing head in the direction of the type wheel, feed mechanism including a pair of coacting rolls, means for driving one of the rolls including the rack carried by the spacing head and a clutch device coöperating therewith, a pivotally supported dog engaging the clutch device to prevent backlash of the feed roll, swingingly mounted supporting means for the dog, and means for effecting adjustment of the swingingly mounted supporting means, in combination with a printing lever, and a resilient connection between said lever and the spacing head for actuating the latter.

9. In a machine of the class described, a guide post, a spacing head guided thereon and having a rack, a type wheel, means for limiting the movement of the spacing head in the direction of the type wheel, feed mechanism including a pair of coacting rolls, means for driving one of the rolls including the rack carried by the spacing head and a clutch device coöperating therewith, a pivotally supported dog engaging the clutch device to prevent backlash of the feed roll, swingingly mounted supporting means for the dog, and means for effecting adjustment of the swingingly mounted supporting means; in combination with a printing lever, a resilient connection between said lever and the spacing head for actuating the latter, and means for limiting the retracting movement of the spacing head with respect to the type wheel.

10. In a machine of the class described, a type wheel supported for rotation and having spacing slots, a vertically movable spacing head carrying means to engage the spacing slots thereby to limit the projecting movement of the spacing head with respect to the type wheel, feed mechanism actuated by the spacing head and including a clutch device, means for actuating the spacing head including a printing lever and a resilient and slidable connection between said lever and the spacing head, a dog engaging the clutch device to prevent backlash of the feed mechanism, and means actuated by the printing lever for releasing the dog from the clutch device at the end of the printing stroke of said lever.

11. In a machine of the class described, a type wheel supported for rotation and having spacing slots, a vertically movable spacing head carrying means to engage the spacing slots thereby to limit the projecting movement of the spacing head with respect to the type wheel, feed mechanism actuated by the spacing head and including a clutch device, means for actuating the spacing head including a printing lever and a resilient and slidable connection between said lever and the spacing head, a dog engaging the clutch device to prevent backlash of the feed mechanism, and means actuated by the printing lever for releasing the dog from the clutch device at the end of the printing stroke of said lever, said means including a tripping plate and a vertically movable pin actuated by the plate and having a notch in which the dog is loosely accommodated.

12. In a machine of the class described, a type wheel supported for rotation and having spacing slots, a vertically movable spacing head carrying means to engage the spacing slots thereby to limit the projecting movement of the spacing head with respect to the type wheel, feed mechanism actuated by the spacing head and including a clutch device, means for actuating the spacing head including a printing lever and a resilient and slidable connection between said lever and the spacing head, a dog engaging the clutch device to prevent backlash of the feed mechanism, and means actuated by the printing lever for releasing the dog from the clutch device at the end of the printing stroke of said lever, said means including a tripping plate and a vertically movable pin actuated by the plate and having a notch in which the dog is loosely accommodated, said plate having a stop member adjustably connected therewith and lying in the path of the spacing head to limit the retracting movement thereof with respect to the type wheel.

13. In a machine of the class described, a type wheel, a spring retracted printing lever, a spacing device including a slidably supported spacing head, means for limiting the projecting movement of the spacing device with respect to the type wheel prior to the completion of the printing movement of the printing lever, a feed device actuated by means associated with the spacing head and a clutch device coöperating therewith, and means for preventing the retracting movement of the printing lever prior to the completion of the printing stroke thereof.

14. In a machine of the class described, a type wheel, a spring retracted printing lever, a spacing device including a slidably supported spacing head, means for limiting the projecting movement of the spacing device with respect to the type wheel prior to the completion of the printing movement of the printing lever, a feed device actuated by means associated with the spacing head and a clutch device coöperating therewith, and means for preventing the retracting movement of the printing lever prior to the completion of the printing stroke thereof, said means including a dog engaging the clutch to prevent backlash of the feed mechanism.

15. In a machine of the class described, a type wheel, a spring retracted printing lever, a spacing device including a slidably supported spacing head, means for limiting the projecting movement of the spacing device with respect to the type wheel prior to the completion of the printing movement of the printing lever, a feed device actuated by means associated with the spacing head and a clutch device coöperating therewith, and means for preventing the retracting movement of the printing lever prior to the completion of the printing stroke thereof, said means including a dog engaging the clutch to prevent backlash of the feed mechanism, in combination with means for releasing the dog from the clutch device at the completion of the printing stroke of the printing lever.

16. In a machine of the class described, a type wheel, a spring retracted printing lever, a spacing device including a slidably supported spacing head, means for limiting the projecting movement of the spacing device with respect to the type wheel prior to the completion of the printing movement of the printing lever, a feed device actuated by means associated with the spacing head and a clutch device coöperating therewith, and means for preventing the retracting movement of the printing lever prior to the completion of the printing stroke thereof, said means including a dog engaging the clutch to prevent backlash of the feed mechanism, in combination with means for releasing the dog from the clutch device at the completion of the printing stroke of the printing lever, and tension means to retain the dog in inactive position until the completion of the retracting movement of the printing lever.

In testimony whereof we affix our signatures.

JOERGEN von BRETHORST.
FRANK W. PRIESTLEY.

Copies of this patent may be obtained for five cents each, by addressing the "Commissioner of Patents, Washington, D. C."